(12) United States Patent
Hasegawa et al.

(10) Patent No.: US 12,485,971 B2
(45) Date of Patent: Dec. 2, 2025

(54) SIDE SILL STRUCTURE OF VEHICLE

(71) Applicant: Honda Motor Co., Ltd., Tokyo (JP)

(72) Inventors: Atsushi Hasegawa, Saitama (JP); Hitomi Yamada, Saitama (JP); Yumi Saito, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 18/170,479

(22) Filed: Feb. 16, 2023

(65) Prior Publication Data

US 2023/0312002 A1    Oct. 5, 2023

(30) Foreign Application Priority Data

Mar. 31, 2022 (JP) ................................. 2022-060074

(51) Int. Cl.
*B62D 25/02* (2006.01)
*B62D 21/15* (2006.01)

(52) U.S. Cl.
CPC ......... *B62D 25/025* (2013.01); *B62D 21/157* (2013.01)

(58) Field of Classification Search
CPC .. B62D 25/025; B62D 25/20; B62D 25/2009; B62D 25/2036; B62D 27/023; B62D 21/157
USPC ................................ 296/209, 29, 30, 187.12
See application file for complete search history.

(56) References Cited

U.S. PATENT DOCUMENTS

| | | | |
|---|---|---|---|
| 6,834,912 B2 * | 12/2004 | Cardimen | B62D 21/157 296/29 |
| 2004/0012230 A1 | 1/2004 | Burge | |
| 2009/0146457 A1 | 6/2009 | Kanagai et al. | |
| 2010/0207426 A1 | 8/2010 | Tsuruta et al. | |
| 2016/0052552 A1 | 2/2016 | Yamamoto | |
| 2019/0217898 A1 | 7/2019 | Tchepikov et al. | |
| 2021/0061365 A1 | 3/2021 | Ebisumoto et al. | |
| 2021/0094618 A1 | 4/2021 | Ebisumoto et al. | |

FOREIGN PATENT DOCUMENTS

| | | | |
|---|---|---|---|
| CN | 102001361 | 4/2011 | |
| CN | 105102309 | 11/2015 | |
| CN | 110053670 | 7/2019 | |
| CN | 112441136 | 3/2021 | |
| CN | 112572617 | 3/2021 | |
| DE | 19528874 C2 * | 2/1998 | ............ B60N 2/015 |
| JP | 2004051095 | 2/2004 | |
| JP | 2007314131 | 12/2007 | |
| JP | 2010155509 A * | 7/2010 | |

(Continued)

OTHER PUBLICATIONS

DE19528874 Text (Year: 1998).*

(Continued)

*Primary Examiner* — Dennis H Pedder
(74) *Attorney, Agent, or Firm* — JCIPRNET

(57) ABSTRACT

A side sill of a vehicle includes an inner panel, an outer panel, and a reinforcing member arranged within a closed section formed by joining the inner panel and the outer panel. The reinforcing member includes a first reinforcing member joined to the inner panel and a second reinforcing member joined to the outer panel. The first reinforcing member and the second reinforcing member are arranged side by side so as to face each other in a vehicle width direction.

6 Claims, 5 Drawing Sheets

(56) References Cited

FOREIGN PATENT DOCUMENTS

JP    2012126188    7/2012
KR     970058069   11/1997
WO    2009038088    3/2009

OTHER PUBLICATIONS

JP2010155509 Text (Year: 2010).*
"Office Action of China Counterpart Application", issued on Sep. 27, 2025, with English translation thereof, p. 1- p. 12.
"Notice of Reasons for Refusal of Japan Counterpart Application", issued on Sep. 30, 2025, with English translation thereof, p. 1-p. 9.

* cited by examiner

SIDE SILL STRUCTURE OF VEHICLE

CROSS-REFERENCE TO RELATED APPLICATIONS

This application claims the priority benefit of Japan Application No. 2022-060074, filed on Mar. 31, 2022. The entirety of the above-mentioned patent application is hereby incorporated by reference herein and made a part of this specification.

BACKGROUND

Technical Field

The disclosure relates to a side sill structure of a vehicle.

Related Art

Conventionally, in a vehicle, a side sill extending in a front-rear direction of the vehicle is provided at both ends in a vehicle width direction of a floor of a vehicle body. The side sill is required to have certain strength or rigidity in order to, for example, protect the interior of the vehicle against a side collision or improve torsional rigidity of the vehicle body. As a side sill structure for satisfying the above requirement, a technology disclosed in Patent Document 1, for example, is known.

A side sill structure disclosed in Patent Document 1 includes an inner panel constituting an inside in a vehicle width direction, an outer panel constituting an outside in the vehicle width direction, and a reinforcing member (also called a "bulkhead") arranged within a closed section formed by joining the inner panel and the outer panel.

The reinforcing member includes a plurality of ribs and is joined to the inner panel and the outer panel of the side sill by a foam adhesive. In the related art, by providing the reinforcing member, it is possible to distribute and transmit a load at the time of a side collision to the interior side of the vehicle and suppress deformation of the side sill.

[Patent Document 1] Japanese Patent Laid-open No. 2012-126188

There is a fear that the reinforcing member in the related art may not be able to cope with various side collision loads. Also, since the reinforcing member is joined to the inner panel and the outer panel of the side sill by the foam adhesive, when a load that twists the side sill is input at the time of a side collision, there is a fear that the foam adhesive may peel off and the inner panel and the outer panel may peel off.

In addition, since the reinforcing member in the related art has a complex structure, a problem has arisen that the manufacturing cost may increase.

SUMMARY

In one embodiment, a side sill structure of a vehicle is provided, in which a side sill arranged at both ends in a vehicle width direction of a floor of a vehicle body and extending in a front-rear direction of the vehicle includes: an inner panel, constituting an inside in the vehicle width direction; an outer panel, constituting an outside in the vehicle width direction; and a reinforcing member, arranged within a closed section formed by joining the inner panel and the outer panel. The reinforcing member includes a first reinforcing member joined to the inner panel and a second reinforcing member joined to the outer panel. The first reinforcing member and the second reinforcing member are arranged side by side so as to face each other in the vehicle width direction.

DESCRIPTION OF THE EMBODIMENTS

Figure 1:
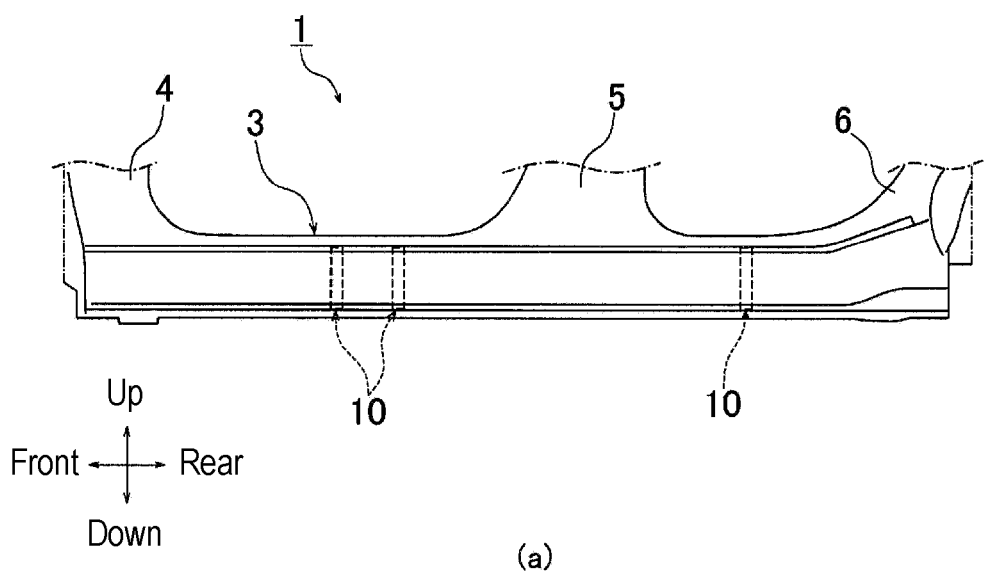
FIG. 1 illustrates a side sill structure of a vehicle according to one embodiment of the disclosure, in which (a) is a side view showing a state as viewed from a side of a lower edge side of a vehicle body of the vehicle, and (b) is a perspective view showing a state of a side sill, a floor and the like shown in (a) as viewed obliquely from above.
Figure 1:
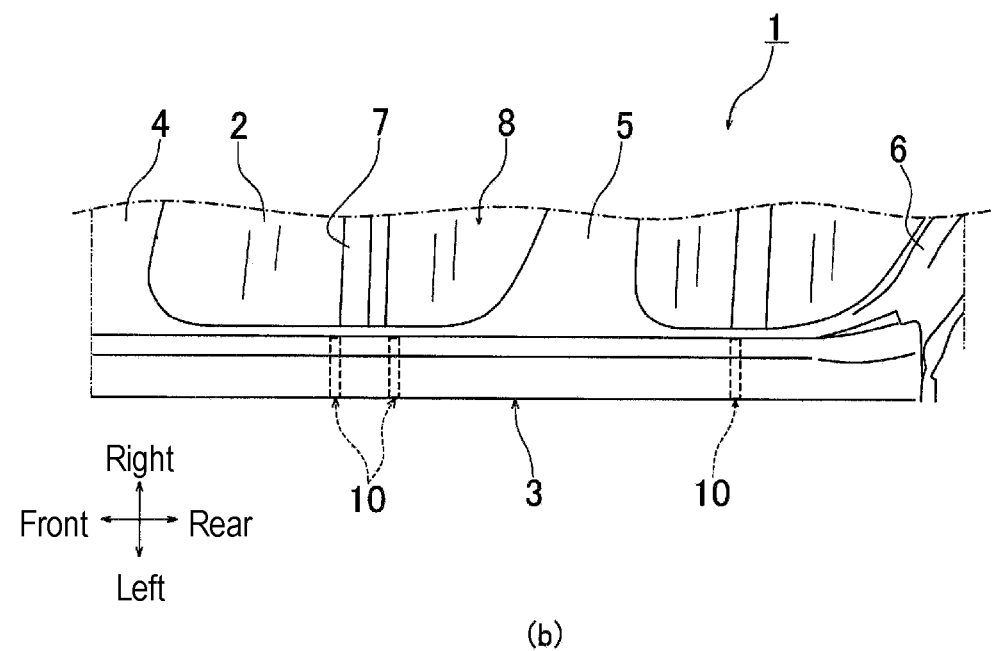

In the disclosure, a side sill structure of a vehicle is provided in which peeling and deformation of a sectional shape of a side sill during input of a side collision load are suppressed to thereby enable improved efficiency of load transmission to a vehicle body side. Thereby, while the safety of transportation by vehicle is improved, deterioration of smoothness of transportation is suppressed.

In one aspect of the disclosure, a side sill structure of a vehicle is provided, in which a side sill arranged at both ends in a vehicle width direction of a floor of a vehicle body and extending in a front-rear direction of the vehicle includes: an inner panel, constituting an inside in the vehicle width direction; an outer panel, constituting an outside in the vehicle width direction; and a reinforcing member, arranged within a closed section formed by joining the inner panel and the outer panel. The reinforcing member includes a first reinforcing member joined to the inner panel and a second reinforcing member joined to the outer panel. The first reinforcing member and the second reinforcing member are arranged side by side so as to face each other in the vehicle width direction.

In another aspect of the disclosure, a facing part at which the first reinforcing member and the second reinforcing member face each other has an upper end and a lower end offset in the vehicle width direction when viewed in an axial direction of the side sill.

In another aspect of the disclosure, the first reinforcing member is joined to an inner wall of the inner panel and to an upper wall and a lower wall extending outward in the vehicle width direction from the inner wall. The second reinforcing member is joined to an outer wall of the outer panel and to an upper wall and a lower wall extending inward in the vehicle width direction from the outer wall.

In another aspect of the disclosure, a first convex part protruding outward in the vehicle width direction is provided on an upper side of the first reinforcing member, and the second reinforcing member includes a first concave part corresponding to the first convex part.

In another aspect of the disclosure, a second concave part concave inward in the vehicle width direction is provided on a lower side of the first reinforcing member, and the second reinforcing member includes a second convex part corresponding to the second concave part.

In another aspect of the disclosure, the side sill includes a joining flange formed by joining the inner panel and the outer panel. The first convex part extends outward in the vehicle width direction from the joining flange.

In another aspect of the disclosure, a plurality of the reinforcing members are provided. The plurality of the reinforcing members are arranged at both ends of a cross member extending in the vehicle width direction in the floor.

According to the above aspect, since the first reinforcing member joined to the inner panel and the second reinforcing member joined to the outer panel are provided, and the first reinforcing member and the second reinforcing member are arranged side by side so as to face each other in the vehicle width direction, when the side sill is twisted by input of a side collision load, the first reinforcing member and the second reinforcing member abut, and load transmission between the reinforcing member (first reinforcing member and second reinforcing member) and the side sill is enabled.

As a result, it is possible to suppress peeling of the side sill or deformation of a sectional shape of the side sill during input of a side collision load, and it is possible to improve the efficiency of load transmission to the vehicle body side.

According to the above aspect, since the reinforcing member has a simpler structure than the related art, the manufacturing cost can be reduced compared to the related art.

According to the above aspect, since the facing part at which the first reinforcing member and the second reinforcing member face each other has the upper end and the lower end offset in the vehicle width direction when viewed in the axial direction of the side sill, when the side sill is twisted by input of a side collision load, the first reinforcing member and the second reinforcing member are engaged at the facing part, and it is possible to improve the load transmission efficiency between the reinforcing member (first reinforcing member and second reinforcing member) and the side sill.

As a result, it is possible to suppress peeling of the side sill or deformation of a sectional shape of the side sill during input of a side collision load, and it is possible to improve the efficiency of load transmission to the vehicle body side.

According to the above aspect, since the first reinforcing member is joined to the inner wall, the upper wall and the lower wall of the inner panel, and the second reinforcing member is joined to the outer wall, the upper wall and the lower wall of the outer panel, when the side sill is twisted by input of a side collision load, the first reinforcing member and the second reinforcing member are engaged at the facing part, and it is possible to improve the load transmission efficiency between the reinforcing member (first reinforcing member and second reinforcing member) and the side sill.

As a result, it is possible to suppress peeling or deformation of the side sill, and it is possible to suppress particularly deformation of a ridge in a corner of the side sill.

According to the above aspect, since the first convex part protruding outward in the vehicle width direction is provided on the upper side of the first reinforcing member, and the second reinforcing member includes the first concave part corresponding to the first convex part, when the side sill is twisted by input of a side collision load, the first reinforcing member and the second reinforcing member are engaged at the facing part, and it is possible to improve the load transmission efficiency between the reinforcing member (first reinforcing member and second reinforcing member) and the side sill.

As a result, it is possible to suppress peeling of the side sill or deformation of a sectional shape of the side sill during input of a side collision load, and it is possible to improve the efficiency of load transmission to the vehicle body side.

Since a moment (twist) occurs in the side sill so that the side sill collapses into the interior of the vehicle, the second reinforcing member can be reliably engaged with the first convex part, and it is possible to improve the load transmission efficiency between the reinforcing member and the side sill.

According to the above aspect, since the second concave part concave inward in the vehicle width direction is provided on the lower side of the first reinforcing member, and the second reinforcing member includes the second convex part corresponding to the second concave part, when the side sill is twisted by input of a side collision load, the first reinforcing member and the second reinforcing member are engaged at the facing part, and it is possible to improve the load transmission efficiency between the reinforcing member (first reinforcing member and second reinforcing member) and the side sill.

As a result, it is possible to suppress peeling of the side sill or deformation of a sectional shape of the side sill during input of a side collision load, and it is possible to improve the efficiency of load transmission to the vehicle body side.

Since a moment (twist) occurs in the side sill so that the side sill collapses into the interior, the second reinforcing member can be reliably engaged with the second concave part, and it is possible to improve the load transmission efficiency between the reinforcing member and the side sill.

According to the above aspect, since the first convex part extends outward in the vehicle width direction from the joining flange, a load input to the joining flange on the upper side can be distributed to the first convex part. Thus, it is possible to suppress peeling of a joining part that forms the joining flange by joining.

As a result, it is possible to suppress peeling of the side sill or deformation of a sectional shape of the side sill during input of a side collision load, and it is possible to improve the efficiency of load transmission to the vehicle body side.

According to the above aspect, since a plurality of the reinforcing members are provided, and the plurality of the reinforcing members are arranged at both ends of the cross member extending in the vehicle width direction in the floor, even if a side collision load is input from either side of the vehicle in the vehicle width direction, when the side sill is twisted, the first reinforcing member and the second reinforcing member abut, and load transmission between the reinforcing member (first reinforcing member and second reinforcing member) and the side sill is enabled.

As a result, it is possible to suppress peeling of the side sill or deformation of a sectional shape of the side sill during input of a side collision load, and it is possible to improve the efficiency of load transmission to the vehicle body side.

Hereinafter, an embodiment of the disclosure will be described with reference to FIG. 1 to FIG. 5.

Figure 2:
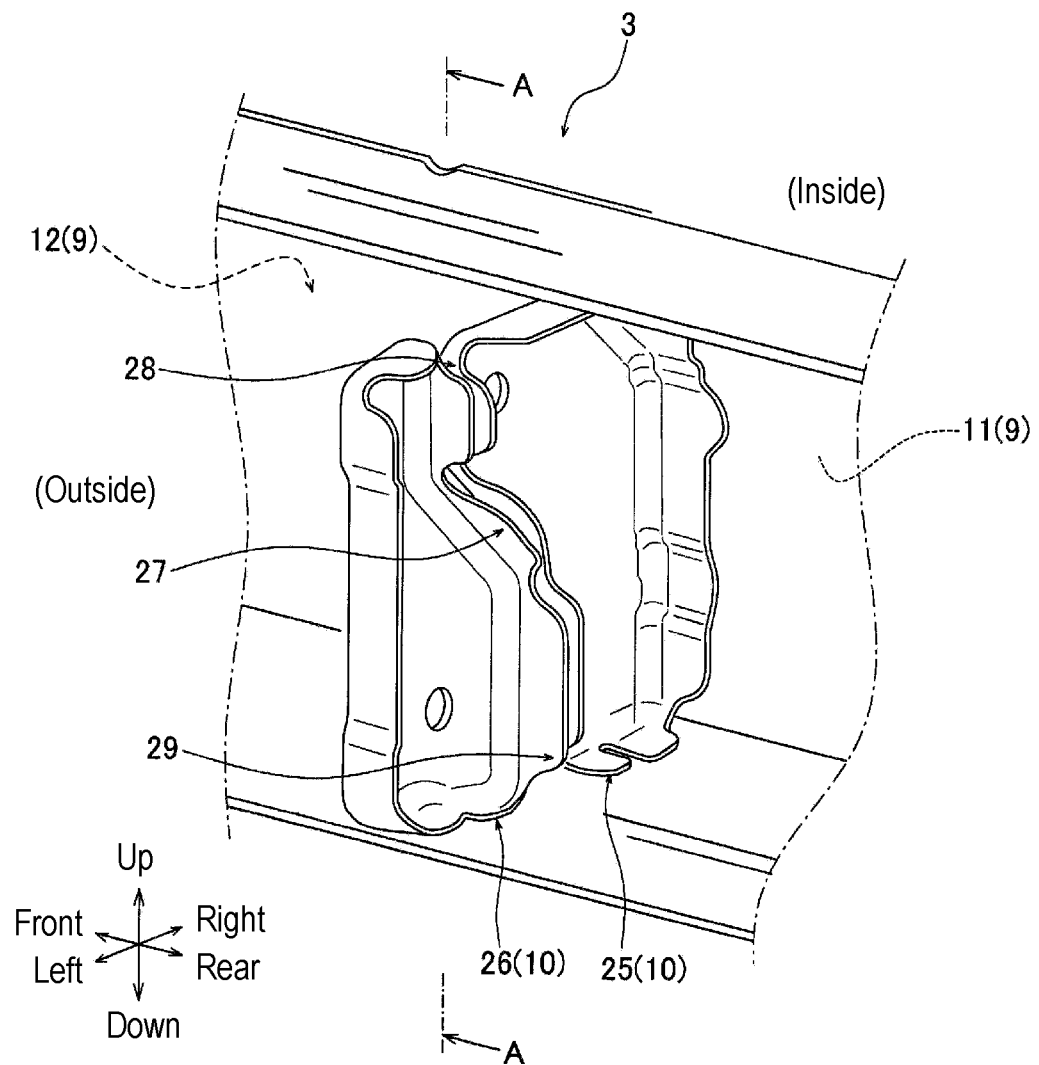
FIG. 2 is a partially see-through view of a portion of the side sill structure shown in FIG. 1, and is a perspective view showing a state as viewed from the front in a front-rear direction of the vehicle and obliquely from the lower right.
Figure 3:
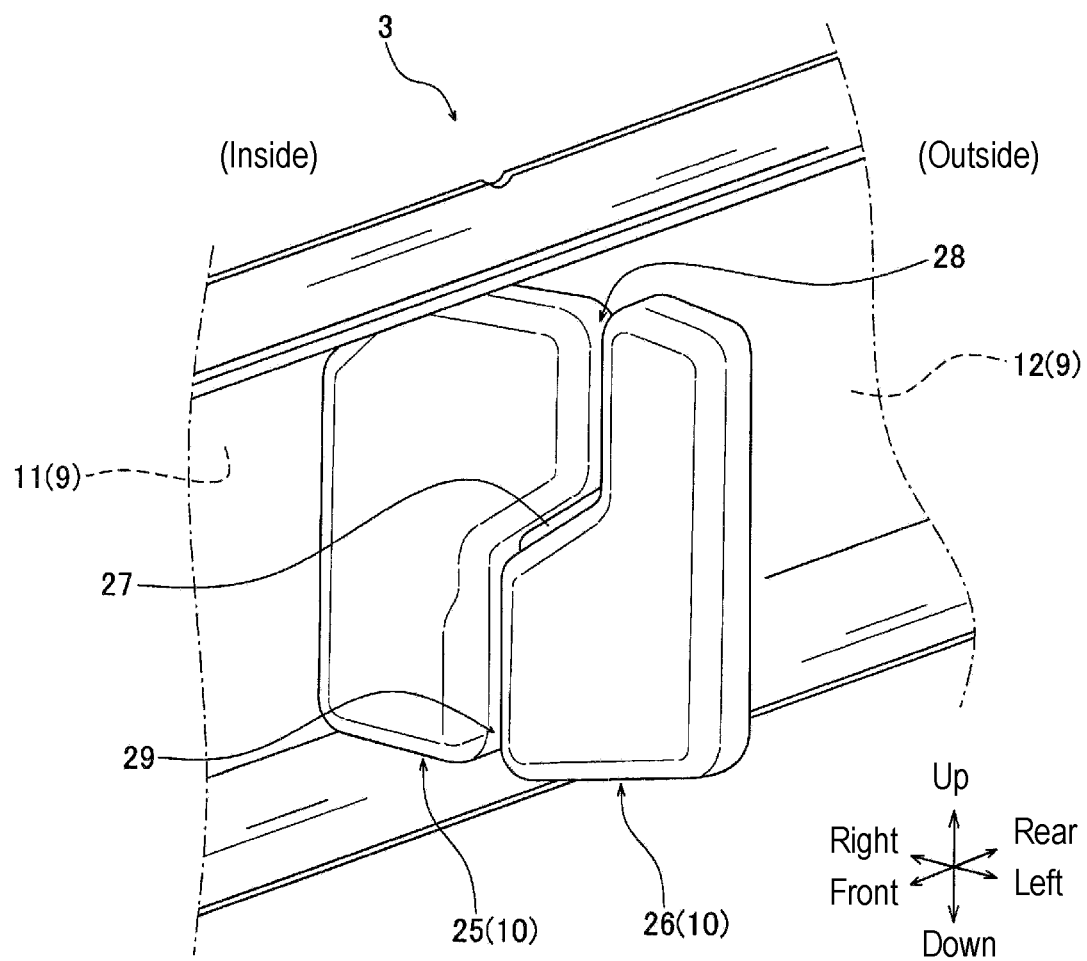
FIG. 3 is a partially see-through view of a portion of the side sill structure shown in FIG. 1, and is a perspective view showing a state as viewed from the rear in the front-rear direction of the vehicle and obliquely from the upper left.
Figure 4:
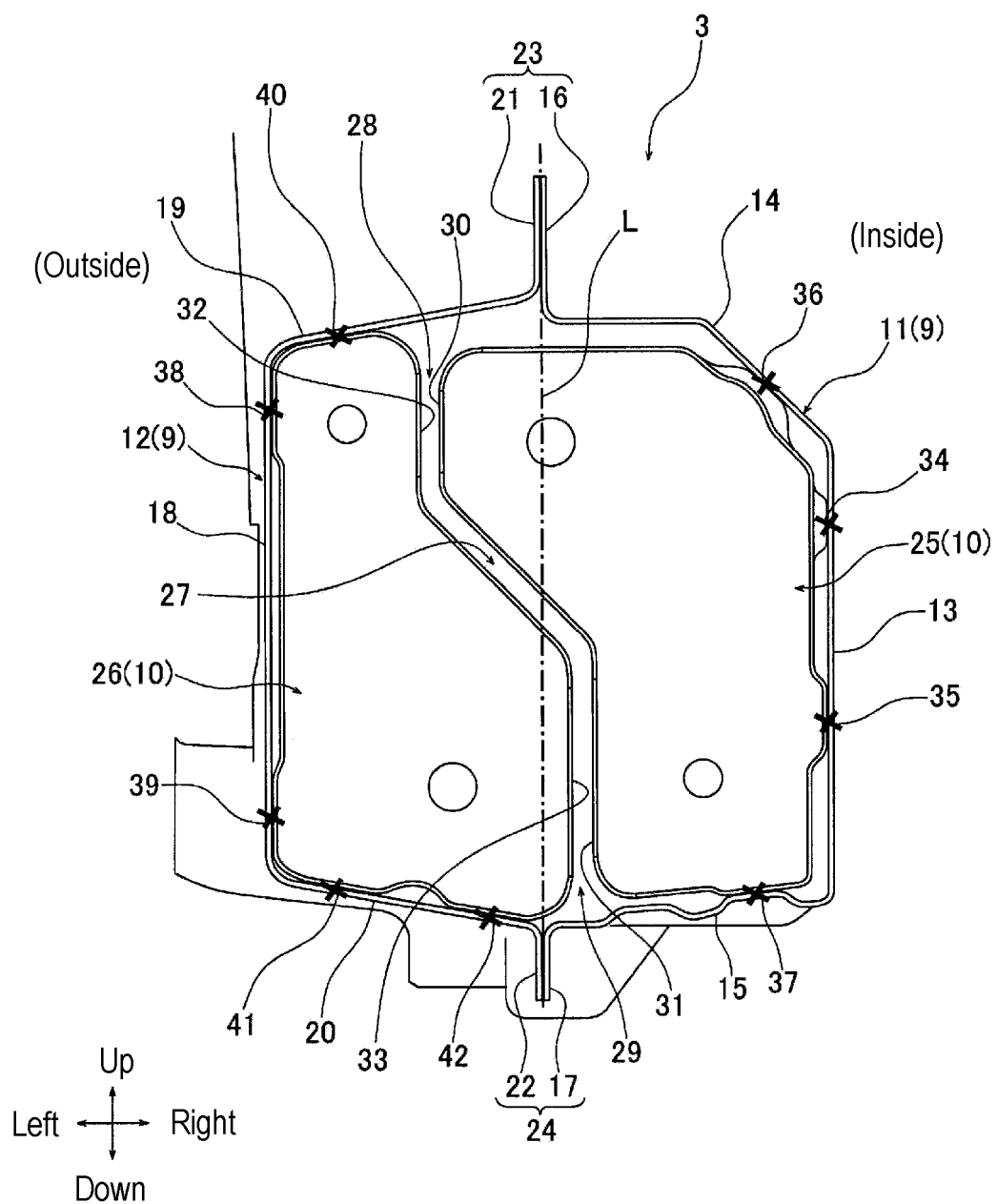
FIG. 4 is a sectional view taken along line A-A in FIG. 2.
Figure 5:
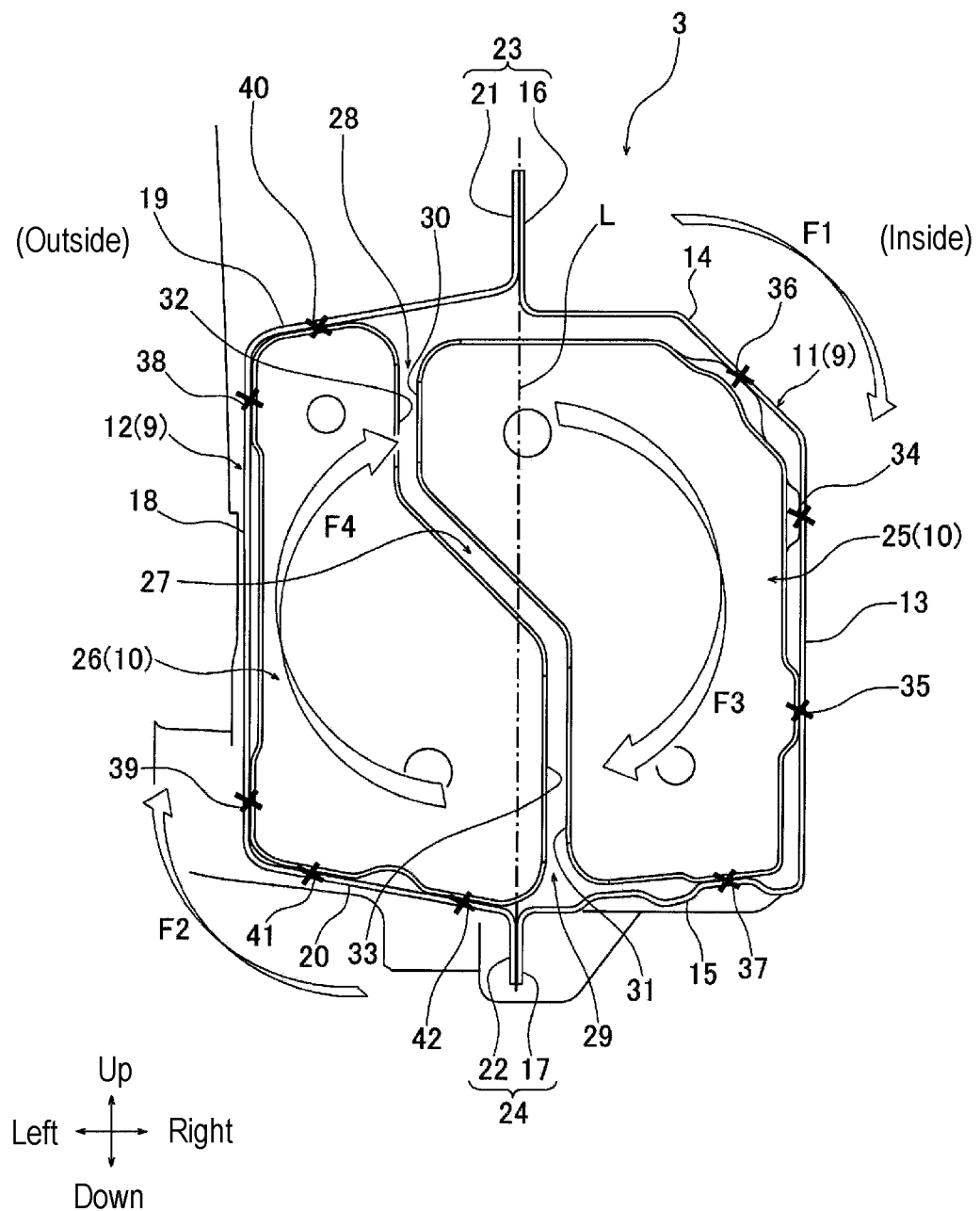
FIG. 5 illustrates an effect of a side sill structure according to one embodiment of the disclosure when a load that twists a side sill is input.

FIG. 1 illustrates a side sill structure of a vehicle according to one embodiment of the disclosure, in which (a) is a side view showing a state as viewed from a side of a lower edge side of a vehicle body of the vehicle, and (b) is a perspective view showing a state of a side sill, a floor and the like shown in (a) as viewed obliquely from above. FIG. 2 is a partially see-through view of a portion of the side sill structure shown in FIG. 1, and is a perspective view showing a state as viewed from the front in a front-rear direction of the vehicle and obliquely from the lower right. FIG. 3 is a partially see-through view of a portion of the side sill structure shown in FIG. 1, and is a perspective view showing a state as viewed from the rear in the front-rear direction of the vehicle and obliquely from the upper left. FIG. 4 is a sectional view taken along line A-A in FIG. 2. FIG. 5 illustrates an effect of a side sill structure according to one embodiment of the disclosure when a load that twists a side sill is input.

The arrows in the drawings indicate the up-down direction, the left-right direction, and the front-rear direction, respectively (the arrow directions are an example).

In the present embodiment, a case is described where a side sill structure according to the disclosure is applied to a side sill 3 arranged at both ends in a vehicle width direction (left-right direction in FIG. 1) of a floor 2 of a vehicle body 1 of a vehicle shown in FIG. 1 and extending in the front-rear direction of the vehicle body 1.

Reference sign 4, reference sign 5, reference sign 6, reference sign 7, and reference sign 8 shown in FIG. 1 respectively denote a "front pillar," a "center pillar," a "rear pillar," a "cross member," and "interior."

The front pillar 4, the center pillar 5 and the rear pillar 6 are respectively arranged to extend upward so as to intersect the side sill 3 with a front side, a substantially middle part, and a rear side of the vehicle body 1 as base ends. The cross member 7 extends in the vehicle width direction in the floor 2 and is arranged to connect a pair of side sills 3.

As shown in FIG. 2 to FIG. 4, the side sill 3 includes a hollow frame body 9 extending in the front-rear direction of the vehicle body 1 and a reinforcing member 10 arranged inside the frame body 9. The frame body 9 is configured by joining an inner panel 11 that constitutes an inside in the vehicle width direction and an outer panel 12 that constitutes an outside in the vehicle width direction. Each configuration of the side sill 3 according to the present embodiment will be described below.

First, the inner panel 11 is described.

As shown in FIG. 4, the inner panel 11 includes an inner wall 13, an upper wall 14, a lower wall 15, and joining parts 16 and 17.

The upper wall 14 is formed so that one end of the upper wall 14 is continuous with an upper end of the inner wall 13 and extends outward in the vehicle width direction. The lower wall 15 is formed so that one end of the lower wall 15 is continuous with a lower end of the inner wall 13 and extends outward in the vehicle width direction.

The joining part 16 is formed so as to be continuous with the other end of the upper wall 14 and extend upward orthogonal to an axial direction of the side sill 3. The joining part 17 is formed so as to be continuous with the other end of the lower wall 15 and extend downward orthogonal to the axial direction of the side sill 3.

Next, the outer panel 12 is described.

As shown in FIG. 4, the outer panel 12 includes an outer wall 18, an upper wall 19, a lower wall 20, and joining parts 21 and 22.

The upper wall 19 is formed so that one end of the upper wall 19 is continuous with an upper end of the outer wall 18 and extends inward in the vehicle width direction. The lower wall 20 is formed so that one end of the lower wall 20 is continuous with a lower end of the outer wall 18 and extends inward in the vehicle width direction.

The joining part 21 is formed so as to be continuous with the other end of the upper wall 19 and extend upward orthogonal to the axial direction of the side sill 3. The joining part 22 is formed so as to be continuous with the other end of the lower wall 20 and extend downward orthogonal to the axial direction of the side sill 3.

As shown in FIG. 4, the frame body 9 includes joining flanges 23 and 24 formed by joining the inner panel 11 and the outer panel 12. The joining flange 23 is formed on the upper side of the frame body 9, and the joining flange 24 is formed on the lower side of the frame body 9.

The joining flange 23 is formed by joining the joining part 16 of the inner panel 11 and the joining part 21 of the outer panel 12. The joining flange 24 is formed by joining the joining part 17 of the inner panel 11 and the joining part 22 of the outer panel 12.

As shown in FIG. 4, the joining flanges 23 and 24 are arranged in substantially the same position in the vehicle width direction and are arranged to face each other in the up-down direction.

Next, the reinforcing member 10 is described.

The reinforcing member 10 shown in FIG. 2 to FIG. 4 is a member also called a "bulkhead", and is arranged inside the frame body 9, that is, within a closed section formed by joining the inner panel 11 and the outer panel 12.

The side sill 3 in the present embodiment includes a plurality of reinforcing members 10, and the reinforcing members 10 are arranged at predetermined intervals along a longitudinal direction of the frame body 9. In the present embodiment, two reinforcing members 10 are arranged at both ends of the cross member 7 in the floor 2 (see (b) of FIG. 1). In the present embodiment, the reinforcing member 10 is also arranged between the center pillar 5 and the rear pillar 6.

As shown in FIG. 2 to FIG. 4, the reinforcing member 10 is divided into two members, including a first reinforcing member 25 and a second reinforcing member 26. Each of the first reinforcing member 25 and the second reinforcing member 26 is formed in a plate shape and has a predetermined shape as described later.

The first reinforcing member 25 and the second reinforcing member 26 are arranged side by side so as to face each other with a predetermined interval therebetween in the vehicle width direction. The "predetermined interval" mentioned above is a facing part 27. When viewed in the axial direction of the side sill 3, an upper end 28 and a lower end 29 of the facing part 27 may be offset in the vehicle width direction.

As shown in FIG. 4, the first reinforcing member 25 includes a first convex part 30 and a second concave part 31. The first convex part 30 is formed on the upper side of the first reinforcing member 25 so as to protrude outward in the vehicle width direction. The second concave part 31 is formed on the lower side of the first reinforcing member 25 so as to be concave inward in the vehicle width direction.

As shown in FIG. 4, the second reinforcing member 26 includes a first concave part 32 corresponding to the first convex part 30 and a second convex part 33 corresponding to the second concave part 31. The first concave part 32 is formed on the upper side of the second reinforcing member 26 so as to be concave outward in the vehicle width direction. The second convex part 33 is formed on the lower side of the second reinforcing member 26 so as to be convex inward in the vehicle width direction.

As shown in FIG. 4, the first convex part 30 is arranged to extend outward in the vehicle width direction from the joining flanges 23 and 24 (imaginary line L). As shown in FIG. 4, the second convex part 33 is arranged to extend inward in the vehicle width direction from the joining flanges 23 and 24 (imaginary line L).

The first reinforcing member 25 is joined to the inner panel 11, and the second reinforcing member 26 is joined to the outer panel 12. Here, the term "joining" mentioned in the present embodiment refers to joining by welding.

The first reinforcing member 25 is joined to each of the inner wall 13, the upper wall 14 and the lower wall 15 of the inner panel 11. The first reinforcing member 25 and the inner wall 13 are joined at joints 34 and 35. The first reinforcing member 25 and the upper wall 14 are joined at a joint 36. The first reinforcing member 25 and the lower wall 15 are joined at a joint 37.

The second reinforcing member 26 is joined to each of the outer wall 18, the upper wall 19 and the lower wall 20 of the outer panel 12. The second reinforcing member 26 and the outer wall 18 are joined at joints 38 and 39. The second reinforcing member 26 and the upper wall 19 are joined at a joint 40. The second reinforcing member 26 and the lower wall 20 are joined at joints 41 and 42.

Next, effects obtained according to the present embodiment are described with reference to FIG. 4 and FIG. 5.

According to the present embodiment, since the first reinforcing member 25 joined to the inner panel 11 and the second reinforcing member 26 joined to the outer panel 12 are provided, and the first reinforcing member 25 and the second reinforcing member 26 are arranged side by side so as to face each other in the vehicle width direction, when the side sill 3 is twisted by input of a side collision load (for example, see the directions of arrows F1 and F2 shown in FIG. 5), the first reinforcing member 25 and the second reinforcing member 26 abut (for example, see the directions of arrows F3 and F4 shown in FIG. 5), and load transmission between the reinforcing member 10 (first reinforcing member 25 and second reinforcing member 26) and the side sill 3 is enabled.

As a result, it is possible to suppress peeling of the side sill 3 or deformation of the sectional shape of the side sill 3 during input of a side collision load, and it is possible to improve the efficiency of load transmission to the vehicle body 1 side.

According to the present embodiment, since the reinforcing member 10 has a simpler structure than the related art, the manufacturing cost can be reduced compared to the related art.

According to the present embodiment, since the facing part 27 at which the first reinforcing member 25 and the second reinforcing member 26 face each other has the upper end 28 and the lower end 29 offset in the vehicle width direction when viewed in the axial direction of the side sill 3, when the side sill 3 is twisted by input of a side collision load, the first reinforcing member 25 and the second reinforcing member 26 are engaged at the facing part 27, and it is possible to improve the load transmission efficiency between the reinforcing member 10 (first reinforcing member 25 and second reinforcing member 26) and the side sill 3.

As a result, it is possible to suppress peeling of the side sill 3 or deformation of the sectional shape of the side sill 3 during input of a side collision load, and it is possible to improve the efficiency of load transmission to the vehicle body 1 side.

According to the present embodiment, since the first reinforcing member 25 is joined to the inner wall 13, the upper wall 14 and the lower wall 15 of the inner panel 11, and the second reinforcing member 26 is joined to the outer wall 18, the upper wall 19 and the lower wall 20 of the outer panel 12, when the side sill 3 is twisted by input of a side collision load, the first reinforcing member 25 and the second reinforcing member 26 are engaged at the facing part 27, and it is possible to improve the load transmission efficiency between the reinforcing member 10 (first reinforcing member 25 and second reinforcing member 26) and the side sill 3.

As a result, it is possible to suppress peeling or deformation of the side sill 3, and it is possible to suppress particularly deformation of a ridge in a corner of the side sill 3.

According to the present embodiment, since the first convex part 30 protruding outward in the vehicle width direction is provided on the upper side of the first reinforcing member 25, and the second reinforcing member 26 includes the first concave part 32 corresponding to the first convex part 30, when the side sill 3 is twisted by input of a side collision load, the first reinforcing member 25 and the second reinforcing member 26 are engaged at the facing part 27, and it is possible to improve the load transmission efficiency between the reinforcing member 10 (first reinforcing member 25 and second reinforcing member 26) and the side sill 3.

As a result, it is possible to suppress peeling of the side sill 3 or deformation of the sectional shape of the side sill 3 during input of a side collision load, and it is possible to improve the efficiency of load transmission to the vehicle body 1 side.

Since a moment (twist) occurs in the side sill 3 so that the side sill 3 collapses into the interior 8 of the vehicle, the second reinforcing member 26 can be reliably engaged with the first convex part 30, and it is possible to improve the load transmission efficiency between the reinforcing member 10 and the side sill 3.

According to the present embodiment, since the second concave part 31 concave inward in the vehicle width direction is provided on the lower side of the first reinforcing member 25, and the second reinforcing member 26 includes the second convex part 33 corresponding to the second concave part 31, when the side sill 3 is twisted by input of a side collision load, the first reinforcing member 25 and the second reinforcing member 26 are engaged at the facing part 27, and it is possible to improve the load transmission efficiency between the reinforcing member 10 (first reinforcing member 25 and second reinforcing member 26) and the side sill 3.

As a result, it is possible to suppress peeling of the side sill 3 or deformation of the sectional shape of the side sill 3 during input of a side collision load, and it is possible to improve the efficiency of load transmission to the vehicle body 1 side.

Since a moment (twist) occurs in the side sill 3 so that the side sill 3 collapses into the interior 8, the second reinforcing member 26 can be reliably engaged with the second concave part 31, and it is possible to improve the load transmission efficiency between the reinforcing member 10 and the side sill 3.

According to the present embodiment, since the first convex part 30 extends outward in the vehicle width direction from the joining flanges 23 and 24 (imaginary line L shown in FIG. 4), a load input to the joining flange 23 on the upper side can be distributed to the first convex part 30. Thus, it is possible to suppress peeling of the joining parts 16 and 21 that form the joining flange 23 by joining.

As a result, it is possible to suppress peeling of the side sill 3 or deformation of the sectional shape of the side sill 3 during input of a side collision load, and it is possible to improve the efficiency of load transmission to the vehicle body 1 side.

According to the present embodiment, since a plurality of the reinforcing members 10 are provided, and the plurality of the reinforcing members 10 are arranged at both ends of the cross member 7 extending in the vehicle width direction in the floor 2, even if a side collision load is input from either side of the vehicle in the vehicle width direction, when the side sill 3 is twisted, the first reinforcing member 25 and the second reinforcing member 26 abut, and load transmission between the reinforcing member 10 (first reinforcing member 25 and second reinforcing member 26) and the side sill 3 is enabled.

As a result, it is possible to suppress peeling of the side sill 3 or deformation of the sectional shape of the side sill 3 during input of a side collision load, and it is possible to improve the efficiency of load transmission to the vehicle body 1 side.

In addition, it goes without saying that the disclosure can be modified in various ways without departing from the gist of the disclosure.

What is claimed is:

1. A side sill structure of a vehicle, in which a side sill arranged at both ends in a vehicle width direction of a floor of a vehicle body and extending in a front-rear direction of the vehicle comprises: an inner panel, constituting an inside in the vehicle width direction; an outer panel, constituting an outside in the vehicle width direction; and a reinforcing member, arranged within a closed section formed by joining the inner panel and the outer panel, wherein
   the reinforcing member comprises a first reinforcing member joined to the inner panel and a second reinforcing member joined to the outer panel; and
   the first reinforcing member and the second reinforcing member are arranged side by side so as to face each other in the vehicle width direction,
   wherein a facing part at which the first reinforcing member and the second reinforcing member face each other has an upper end and a lower end offset relatively to each other in the vehicle width direction when viewed in an axial direction of the side sill.

2. The side sill structure of a vehicle according to claim 1, wherein
   the first reinforcing member is joined to an inner wall of the inner panel and to an upper wall and a lower wall extending outward in the vehicle width direction from the inner wall; and
   the second reinforcing member is joined to an outer wall of the outer panel and to an upper wall and a lower wall extending inward in the vehicle width direction from the outer wall.

3. The side sill structure of a vehicle according to claim 2, wherein
   a first convex part protruding outward in the vehicle width direction is provided on an upper side of the first reinforcing member, and the second reinforcing member comprises a first concave part corresponding to the first convex part, wherein the first concave part is concave outward in the vehicle width direction.

4. The side sill structure of a vehicle according to claim 2, wherein
   a second concave part concave inward in the vehicle width direction is provided on a lower side of the first reinforcing member, and the second reinforcing member comprises a second convex part corresponding to the second concave part, wherein the second convex part is convex inward in the vehicle width direction.

5. The side sill structure of a vehicle according to claim 3, wherein
   the side sill further comprises a joining flange formed by joining the inner panel and the outer panel; and
   the first convex part extends outward in the vehicle width direction from the joining flange.

6. The side sill structure of a vehicle according to claim 1, wherein
   a plurality of the reinforcing members are provided, and the plurality of the reinforcing members are arranged at both ends of a cross member extending in the vehicle width direction in the floor.

* * * * *